United States Patent Office 3,373,138
Patented Mar. 12, 1968

3,373,138
PROCESS FOR MAKING SILOXANE POLYMERS FROM SILANES
Eric D. Brown, Midland, Mich., assignor to Dow Corning Corporation, Midland, Mich., a corporation of Michigan
No Drawing. Continuation-in-part of application Ser. No. 341,095, Jan. 29, 1964. This application Dec. 30, 1965, Ser. No. 517,793
4 Claims. (Cl. 260—46.5)

ABSTRACT OF THE DISCLOSURE

The process of hydrolyzing with vigorous agitation at least one organohalosilane in an aqueous solution in the absence of solvents for the siloxance products and the subsequent aging thereof.

---

This application, which is a continuation-in-part of U.S. application Ser. No. 341,095, filed Jan. 29, 1964, now abandoned, relates to a new process for making siloxanes from silanes which has the advantage of avoiding the production of cyclic polysiloxanes.

The formation of cyclic polysiloxanes during the hydrolysis of halosilanes and polymerization of the hydrolyzates to higher polymers is caused by two mechanisms.

One mechanism is siloxane bond rearrangement, by which linear polysiloxane polymers are broken down to lower molecular weight cyclics. This is a reversible reaction, for cyclic siloxanes are also polymerizable to higher molecular weight linear polymers. The proportion of linear polymer which can be found in contact with cyclic siloxanes in any given system varies with the particular siloxane being polymerized, and can be expressed by an equilibrium constant. The amount of linear high polymer at the equilibrium of a given system represents the maximum yield of polymer which can be obtained under siloxane bond-rearranging conditions. When one starts with a hydrolyzate, the yield of linear polymer will be less than this maximum value if the system has not yet reached equilibrium. Thus, during the hydrolysis step alone, the amount of cyclic siloxane may be as high as 50% by weight of the total hydrolyzate.

A second mechanism by which low molecular weight cyclics are formed is by the intramolecular condensation of two SiOH groups. When monomeric silanes are hydrolyzed, the initial products are silanols and siloxanols having an average of less than six silicon atoms per molecule. When these silanols or siloxanols are condensed via hydroxy condensation, a large proportion of the molecules condense in an intramolecular manner. Thus, two hydroxy groups on the same molecule react, forming a cyclic molecule.

In order to prevent cyclic formation during the hydrolysis and polymerization of siloxanes, one must prevent siloxane bond rearrangement and at the same time prevent intramolecular condensation of the initial silanol hydrolysis products.

Particularly severe difficulties arise in the production of linear or branched siloxanes which have fluorinated hydrocarbon substituents, such as

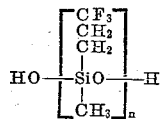

The cyclic tetramers of many of these compounds are so stable that they do not equilibrate to any large proportion of linear polysiloxane. Therefore, more complex processes are required to efficiently prepare linear or branched fluorinated siloxanes, e.g., by means of the preparation and polymerization of the pure cyclic trimer, which process is difficult.

It is an object of this invention to create a simple, efficient process for producing linear and branched fluoroalkylpolysiloxanes by hydrolysis.

The process of this invention comprises hydrolyzing at least one compound of the formula $R_nSiX_{4-n}$ with vigorous agitation with an aqueous solution, the pH of the aqueous solution being from 7 to 11 during and after the hydrolysis reaction, in the absence of solvents for the siloxane products present, the product consisting of over 90 weight percent of noncyclic siloxanes, where R is selected from the group consisting of methyl, vinyl and $R'CH_2CH_2$— where R' is a fluoroalkyl radical, at least 10 mol percent of said R groups being $R'CH_2CH_2$—, X is selected from the group consisting of F, Cl, and Br, and $n$ has an average value of 1.25 to 2.5, and preferably, 1.8 to 2.2.

More than one species of the above compounds can be present in the hydrolysis reaction, i.e., cohydrolysis of two or more species is considered to be within the scope of this invention.

It has been found that under the above-described conditions, less than 10% by weight of cyclic siloxanes will be formed, rather than the usual 50% or more. This fact makes the production of fluorinated polysiloxanes a significantly easier matter.

Vigorous agitation is required to prevent local areas of acidity from forming through the evolution of HX, the hydrolysis byproduct. As is stated above, sufficient base must be present to keep the reaction mixture at a pH of between 7 and 11 throughout the hydrolysis reaction; therefore on agitation the evolved HX will be quickly neutralized. The agitation is also required to keep the insoluble siloxane product from coagulating, avoiding the possibility of an acid buildup inside of the coagulation.

The above-stated pH limitations are critical in that the amount of cyclics produced will rise rapidly as the pH of the hydrolysis mixture goes above 11 or below 7. It is, however, permissible for the hydrolysis mixture to have an initial pH of about 11 when a weak alkali such as ammonia is used, as long as the bulk of the hydrolysis occurs at a pH of no more than 11, because the pH of a weak alkali solution will drop rapidly to below 11 as it is buffered by the salt of the weak alkali and the hydrolysis byproduct HX.

Any hydrolysis process similar to that described above is within the scope of the claims of this invention as long as the hydrolyzate produced contains over 90 mol percent of noncyclic siloxanes.

The temperature of the hydrolysis reaction is not critical, but the linear product will have a higher molecular weight if the temperature is higher. The reaction can be carried out at any temperature from the freezing point to the boiling point of the reaction mixture.

It has also been found that the presence of organic fluids which dissolve the siloxane products will also significantly raise the percentage of product that is cyclic siloxane. They, therefore, should not be present in the reaction mixture.

The products of the hydrolysis step of this invention are predominantly short, linear or branched siloxanes. A large percentage of the siloxane molecules usually have fewer than six silicon atoms.

Another part of this invention is the fact that "aging" of short, linear or branched siloxanes at a pH of over 7 will cause the molecular weight of the siloxanes to increase significantly without the formation of a significant amount of cyclic siloxanes.

If hydroxylated siloxanes which are smaller than hexamer are condensed in the normal manner, i.e., by means of a non-bond-rearranging condensation catalyst such as sodium phenoxide, large amounts of cyclic siloxanes will form during the condensation process.

It is therefore necessary to increase the average length of the siloxanes in a hydrolyzate to hexamer or above before condensing the siloxanes to larger molecules if one wishes to avoid the production of cyclic siloxanes. This can be done by the aging process mentioned above.

The aging process gives excellent results in conjunction with the hydrolysis reaction disclosed in this application. By aging the hydrolyzate for from 4 hours to 3 months in contact with an aqueous solution with a pH of above 7, one can obtain a hydroxylated siloxane product containing less than 30% by weight total cyclic siloxanes plus linear siloxanes containing less than 6 silicon atoms per molecule.

The aging process is applicable to any hydroxylated siloxane polymer having an average of 1.25 to 2.5 of the defined R groups per silicon atom.

By "aging" it is meant to allow the hydrolyzate to stand for a period of time at a pH of over 7. Increased temperature, stirring, and increased pH can be used, each hastening the chain-lengthening, or aging, process, but the aging process definitely occurs at any pH greater than 7.0 even while the hydrolyzate is standing undisturbed at room temperature. The most favorable reaction rates are obtained when the pH is greater than 9.

The aging process appears to be primarily a condensation process. Few, if any, cyclic siloxanes are formed during the aging process.

Following the hydrolysis and aging processes of this application, one can condense the siloxane products of these processes to high molecular weight polymers and copolymers by well-known methods, such as by means of an amine, an amine salt, a carboxylic acid salt of tin or iron, or any other non-bond-rearranging condensation catalyst.

By using the hydrolysis and aging process of this invention, and by then condensing the products thereof, high molecular weight siloxanes can be produced with the production of much less cyclosiloxane than by other methods of hydrolysis and condensation.

By cocondensing two or more aged hydrolyzates, one can obtain nonrandom copolymers containing "blocks" of siloxanes which were formed by the original hydrolysis and aging process.

Endblocking agents may be introduced into the condensation reaction mixture to control the molecular weight of the siloxanes obtained. For example, trimethylchlorosilane plus anhydrous ammonia can be added, blocking the condensable ends of the siloxane molecules with trimethylsilyl groups.

R, which is above defined, can be methyl, vinyl, and any fluoroalkyl radical of the above description such as 3,3,3-trifluoropropyl, 3,3,4,4,4-pentafluorobutyl, 2-perfluorohexylethyl, 2-perfluorooctylethyl, 2-perfluorododecylethyl, 3-fluoropropyl, 3,3,4,4,5,5,6,6-hexafluorohexyl and 2-trifluoromethylpropyl.

R is preferably methyl and radicals of the formula $R'CH_2CH_2-$ where $R'$ is perfluoroalkyl, but optionally small amounts of vinyl groups can also be present if the product is to be crosslinked into an elastomer or resin. Usually, approximately even numbers of methyl and fluoroalkyl radicals are found in the compositions used herein.

Any basic material can be used to regulate the pH of the solutions during the hydrolysis and the aging processes as long as the pH stays in the proper range, although the weaker bases give the best results, as the pH is more easily controlled. Ammonium carbonate, sodium bicarbonate, sodium borate, ammonium bicarbonate, and ammonium hydroxide all give fine results as the base for the hydrolysis process. The same materials as well as strong alkalies such as sodium hydroxide are all satisfactory bases for the aging process.

The following examples are illustrative only and should not be construed as limiting the invention which is properly delineated in the appended claims.

EXAMPLE 1

120 g. of ammonium carbonate were dissolved in one liter of water. To this was added with vigorous stirring, and in a dropwise manner, 211 g. of 3,3,3-trifluoropropylmethyldichlorosilane. The still-alkaline mixture was stirred for one hour. When the stirring ceased, a heavy liquid layer settled under the water layer. The water layer was decanted, leaving the heavier siloxane layer behind.

The siloxane layer was dissolved in ether and washed with water until the water washings were neutral. The ether was then removed by evaporation.

147.5 g. of a siloxane fluid of about 100 cs. viscosity was recovered. Upon analysis, the fluid was found to contain 4% by weight cyclic siloxanes. The rest was a linear siloxane having an average formula of:

$$H-\left[OSi\begin{matrix}CH_3\\|\\|\\CH_2\\CH_2\\CF_3\end{matrix}\right]_{3.44}-OH$$

EXAMPLE 2

190 g. of sodium bicarbonate were dissolved in one liter of water. To this was added, over a 45 minute period, with vigorous stirring, 307 g. of $$CF_3CH_2CH_2CHCH_2SiCl_3$$
$$\qquad\qquad\qquad |\quad\;\;|$$
$$\qquad\qquad\qquad CF_3\;\,CH_3$$

The still-alkaline mixture was heated to reflux for one hour to insure complete hydrolysis. The siloxane formed by the hydrolysis was purified and isolated in the manner of Example 1.

The product contained 4.6 weight percent cyclic siloxanes. The rest of the product was a linear siloxane with an average formula of:

$$HO-\left(CF_3CH_2CH_2CHCH_2SiO\atop |\quad\;\;|\atop CF_3\;\;CH_3\right)_{3.96}-H$$

EXAMPLE 3

197 g. of ammonium bicarbonate were dissolved in one liter of water. To this was added with vigorous stirring over a period of 50 minutes, 211 g. of 3,3,3-trifluoropropylmethyldichlorosilane. The mixture was stirred for one additional hour, the aqueous portion having a pH of 7.9 at the end of that time.

The hydrolyzate was isolated and purified in the manner of Example 1. 144.3 g. of product was recovered, which contained 0.6% cyclic siloxane. The rest was a linear siloxane with an average formula of:

$$HO-\left[\begin{matrix}CF_3CH_2\\|\\CH_2\\|\\SiO\\|\\CH_3\end{matrix}\right]_{2.72}-H$$

EXAMPLE 4

409 g. of $Na_2B_4O_7 \cdot 10H_2O$ were dissolved in one liter of water. To this was added with vigorous stirring, over a period of 40 minutes, 211 g. of 3,3,3-trifluoropropylmethyldichlorosilane.

The alkaline hydrolyzate was collected and purified in the manner of Example 1. The product weighed 152 g. and contained 3.3% cyclic siloxane. The rest was a mixture of linear siloxanes, 98% of which contained less than six silicon atoms per molecule.

EXAMPLE 5

The experiment of Example 1 was repeated, except that the last water wash of the product still showed the presence of alkali. The product was then dried and the ether removed.

150.2 g. of product was recovered, 5.7% of this being cyclic siloxanes. The remainder consisted of linear siloxanes, and had an average formula of $$HO-\left[\begin{array}{c}CF_3CH_2CH_2\\|\\SiO\\|\\CH_3\end{array}\right]_{3.3}-H$$

The still-alkaline sample was allowed to stand undisturbed in a sealed bottle for three months. It was then analyzed, and found to contain 5.7% of cyclic siloxanes, the remainder being linear siloxanes having an average formula of $$HO-\left[\begin{array}{c}CF_3CH_2\\|\\CH_2\\|\\SiO\\|\\CH_3\end{array}\right]_{6.9}-H$$

EXAMPLE 6

185 g. of sodium bicarbonate were dissolved in one liter of water. To this was added over a period of 26 minutes, with vigorous stirring, 211 g. of 3,3,3-trifluoroproplylmethyldichlorosilane. This was then refluxed with agitation for 3 hours and 40 minutes at 100° C. and allowed to cool overnight.

The hydrolyzate was taken up in ether, washed with dilute HCl, and then washed with water until neutral. The hydrolyzate was then filtered and dried.

141.8 g. of product was recovered, consisting of 5.4% cyclic siloxane and 94.6% linear siloxane. The linear siloxane had an average formula of $$HO-\left[\begin{array}{c}CF_3CH_2\\|\\CH_2\\|\\SiO\\|\\CH_3\end{array}\right]_{8.7}-H$$

14.2% by weight of the linear siloxane being composed of molecules containing less than six siloxane units.

EXAMPLE 7

400 ml. of concentrated NH$_4$OH were added to 800 ml. of water. To this was added over a 90 minute period, with vigorous stirring, 575 g. of 3,3,3-trifluoropropylmethyldichlorosilane.

The still-alkaline hydrolyzate was allowed to settle, and the water layer was decanted off. The hydrolyzate was then mixed with an equal volume of a 10% water solution of sodium carbonate (pH 11.0) and the mixture was refluxed at 100° C. for four hours. After this treatment the pH of the aqueous portion was 11.4.

This experiment was repeated to yield a second hydrolyzate, except that the second hydrolyzate solution was refluxed for 24 hours.

Both unrefluxed hydrolyzates contained 4.5% cyclic siloxanes, and 70% of the linear siloxanes were less than hexamer in both cases.

The hydrolyzate that was refluxed for four hours contained 4.5% cyclic siloxanes, and 4% of the linear siloxanes were less than hexamer.

The hydrolyzate that was refluxed for 24 hours contained 6.8% cyclic siloxanes, and 0.4% of the linear siloxanes were less than hexamer.

When these hydrolyzates are condensed with a small amount of sodium phenoxide at 100° C., using an azeotropic trap, high gums are produced.

EXAMPLE 8

285 g. of sodium bicarbonate were placed in 1200 ml. of water. To this was added over a period of 32 minutes, with vigorous stirring, 316.5 g. of 3,3,3-trifluoropropylmethyldichlorosilane.

The mixture was refluxed at 100° C. for 16 hours. The pH at the end of the period was 10.8. The hydrolyzate was allowed to settle, and the water was decanted. To the hydrolyzate there was added 100 ml. of cyclohexane and 10 drops of a mixture of two parts octanoic acid and one part of tetramethylguanidine.

The hydrolyzate was then condensed by refluxing for six hours, using an azeotropic trap to remove water from the system as it was formed.

At the end of the six hours, some trimethylsilanol was added to endstop the condensed product. The product was a viscous fluid, which was then devolatilized at 210° C. at 0.1 mm. pressure overnight. The product lost 6% of its weight through volatilization. 5/6 of these volatiles were cyclic siloxanes.

The viscosity of the devolatilized fluid was 3520 cs., and it consisted of long chain linear siloxanes.

EXAMPLE 9

The experiment of Example 8 was repeated, except that the azeotropic condensation was continued for 12 hours.

The viscosity of the devolatilized product was 5.9 million c.p.s., indicating that the linear siloxanes present were of even greater length than in Example 8.

EXAMPLE 10

96 g. of ammonium carbonate were dissolved in one liter of water. To this was added over a period of 40 minutes, with vigorous stirring, a mixture of 126.6 g. of 3,3,3-trifluoropropylmethyldichlorosilane and 114.3 g. of 3,3,3-trifluoropropyldimethylmonochlorosilane.

The still-alkaline hydrolyzate was collected and purified in the manner of Example 1.

165.8 g. of a clear product was collected. It was a siloxane hydrolyzate containing 3.28% by weight hydroxyl groups. No cyclic siloxane was detectable.

EXAMPLE 11

126 g. of ammonium carbonate were dissolved in one liter of water. To this was added over one hour, with vigorous stirring, a mixture of 126.6 g. of 3,3,3-trifluoropropylmethyldichlorosilane and 92.6 g. of 3,3,3-trifluoropropyltrichlorosilane.

The still-alkaline hydrolyzate was collected and purified in the manner of Example 1.

147 g. of a fluid with a viscosity of 623 cs. was collected. The fluid was a siloxane hydrolyzate with a hydroxyl content of 7.95% by weight. There was no cyclic trimer detected, indicating a low content of cyclics generally.

EXAMPLE 12

To 19.5 g. of sodium bicarbonate dissolved in 250 ml. of water there was slowly added, with vigorous stirring, 51.1 g. of $$\begin{array}{c}C_7F_{15}CH_2CH_2SiCl_2\\|\\CH_3\end{array}$$

The still-alkaline hydrolyzate was refluxed at 100° C. for 12 hours. The water-insoluble phase which had formed during hydrolysis was isolated, which was an ether and acetone-insoluble, clear fluid having a viscosity at 25° C. of 770 cs., and a hydroxyl content of 0.012%, having the approximate formula $$HO-\left[\begin{array}{c}CH_3\\|\\SiO\\|\\CH_2\\|\\CH_2C_7F_{15}\end{array}\right]_9-H$$

No cyclic sepcies of the above polysiloxane were detected.

When this material is condensed with tributylamine octate, a high polymer which is free of cyclic species is formed.

EXAMPLE 13

When 5 g. of the product of Example 12 and 5 g. of the product of Example 6 are dissolved in 30 g. of C$_8$F$_{18}$, addition of 0.1 g. of dibutyltindilaurate under refluxing conditions with an azotropic trap results in the production of a block copolymer containing

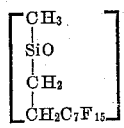

units and

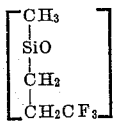

units.

EXAMPLE 14

When a mixture of 1 molar part of 3,3,3-trifluoropropylmethyldibromosilane and 0.5 molar part of vinylmethyldifluorosilane is placed with vigorous stirring in an aqueous ammonia solution having a pH of 11, the pH remaining between 7 and 11 throughout the entire hydrolysis reaction, a siloxane hydrolyzate containing

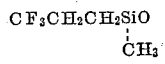

units and

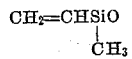

units, which contains less than 10 mol percent of cyclic species, is formed.

I claim:
1. The process of:
   (a) hydrolyzing at least one compound of the formula $R_nSiX_{4-n}$ with vigorous agitation with an aqueous solution, the pH of the aqueous solution being from 7 to 11 during and after the hydrolysis reaction, in the absence of organic solvents for the siloxane products present, the product consisting of over 90 weight percent non-cyclic siloxanes, where R is selected from the group consisting of methyl, vinyl, and $R'CH_2CH_2$— where R' is a fluoroalkyl radical, at least 10 mol percent of said R groups being $R'CH_2CH_2$—, X is selected from the group consisting of F, Cl, and Br, and $n$ has an average value of 1.8 to 2.2, and then
   (b) aging the product for from 4 hours to 3 months in contact with an aqueous solution having a pH of above 7, to obtain a hydroxylated siloxane product containing less than 30 percent by weight total cyclic siloxanes and linear siloxanes containing less than 6 silicon atoms per molecule; then
   (c) condensing the aged product to higher polymeric siloxanes by contacting with a non-bond-rearranging condensation catalyst.
2. The process of claim 1 where R is both methyl and 3,3,3-trifluoropropyl.
3. The process of claim 1 where X is chlorine.
4. The process of claim 1 where $R_nSiX_{4-n}$ is 3,3,3-trifluoropropylmethyldichlorosilane.

References Cited
UNITED STATES PATENTS

| | | | |
|---|---|---|---|
| 2,587,636 | 3/1952 | MacMullen | 260—46.5 |
| 2,915,544 | 12/1959 | Holbrooke et al. | 260—46.5 |
| 3,011,987 | 12/1961 | Walton et al. | 260—46.5 |
| 3,135,713 | 6/1964 | Brewer et al. | 260—46.5 |
| 3,160,601 | 12/1964 | Hyde | 260—46.5 |
| 3,208,972 | 9/1965 | Lyons | 260—448.2 |

FOREIGN PATENTS 687,542   2/1953   Great Britain.

DONALD E. CZAJA, *Primary Examiner.*

L. J. BERCOVITZ, *Examiner.*

M. I. MARQUIS, *Assistant Examiner.*